(12) United States Patent
Barbosa et al.

(10) Patent No.: US 7,690,841 B2
(45) Date of Patent: Apr. 6, 2010

(54) DEVICE FOR CONTINUOUS TEMPERATURE MEASUREMENT OF MOLTEN STEEL IN THE TUNDISH USING OPTICAL FIBER AND INFRA-RED PYROMETER

(75) Inventors: Jose Raposo Barbosa, Ipatinga-MG (BR); Luiz Fernando Marzano, Ipatinga-MG (BR); Fabiano Correa Martins, Ipatinga-MG (BR); Marlon Odilon Xavier Silva, Ipatinga-MG (BR); Aloisio da Silva Gomes, Ipatinga-MG (BR)

(73) Assignee: Usinas Siderurgicas De Minas Gerais S.A. Usiminas, Belo Horizonte - MG (BR)

( * ) Notice: Subject to any disclaimer, the term of this patent is extended or adjusted under 35 U.S.C. 154(b) by 22 days.

(21) Appl. No.: 11/916,593

(22) PCT Filed: Jun. 7, 2006

(86) PCT No.: PCT/BR2006/000133

§ 371 (c)(1),
(2), (4) Date: Dec. 5, 2007

(87) PCT Pub. No.: WO2006/130941

PCT Pub. Date: Dec. 14, 2006

(65) Prior Publication Data

US 2008/0205480 A1    Aug. 28, 2008

(30) Foreign Application Priority Data

Jun. 9, 2005    (BR) .................................. 0502779

(51) Int. Cl.
*G01K 1/08* (2006.01)
*G01J 5/00* (2006.01)

(52) U.S. Cl. ...................... 374/139; 374/140; 374/121; 374/208

(58) Field of Classification Search ................. 374/139, 374/140

See application file for complete search history.

(56) References Cited

U.S. PATENT DOCUMENTS 4,737,038 A * 4/1988 Dostoomian ................ 374/139

(Continued)

FOREIGN PATENT DOCUMENTS

EP    0275059 A    7/1988

(Continued)

*Primary Examiner*—Gail Verbitsky
*Assistant Examiner*—Mirellys Jagan
(74) *Attorney, Agent, or Firm*—Lucas & Mercanti, LLP

(57) ABSTRACT

The system developed for the continuos temperature measurement of molten metal (1), like in the case of the continuous casting machine tundish (2), uses an optical process to control the continuous casting machine speed, and it consists of an optical infra-red sensor (8) protected by a cooled jacket (30). This two-color sensor (8), fitted with optical fiber (9) and an optical signal converter (10), is focused inside a high thermal and light conductivity ceramic tube (15), and it enables accurate temperature readings of molten steel (1) in the tundish (2).

This practical device avoids the inconvenience of the method currently being used. It reduces the operator's high temperature exposure time, lowers maintenance downtime, minimizes the operating risks, improves safety and enables fast, simple replacement, resulting in improved slab quality and, as a consequence, lower costs.

7 Claims, 2 Drawing Sheets

U.S. PATENT DOCUMENTS

| | | | | |
|---|---|---|---|---|
| 4,987,950 A | * | 1/1991 | Yu | 164/455 |
| 5,302,027 A | * | 4/1994 | Park | 374/139 |
| 5,585,914 A | * | 12/1996 | Yamasaki et al. | 356/44 |
| 5,733,043 A | * | 3/1998 | Yamada et al. | 374/131 |
| 2003/0197125 A1 | * | 10/2003 | De Saro et al. | 250/339.07 |
| 2004/0174922 A1 | * | 9/2004 | Yamashita et al. | 374/131 |

FOREIGN PATENT DOCUMENTS

| | | | |
|---|---|---|---|
| JP | 62293128 A | * | 12/1987 |
| WO | 00/075614 A | | 12/2000 |
| WO | 03/029771 A | | 4/2003 |

* cited by examiner

DEVICE FOR CONTINUOUS TEMPERATURE MEASUREMENT OF MOLTEN STEEL IN THE TUNDISH USING OPTICAL FIBER AND INFRA-RED PYROMETER

BACKGROUND OF THE INVENTION

This invention is an improvement introduced in the system for continuous temperature measurement of molten steel using an optical process.

In the past few decades, steel mills have experienced constant improvement in terms of both productivity and energy conservation controls, as well as from the standpoint of environmental preservation.

Taking into consideration that steelmaking processes demand strict thermal control, particularly at high temperatures, temperature measurement plays a fundamental role in the accomplishment of the conditions required for the proper production flow development. Chemical reactions between gases and solid matter inside the blast furnace and the steel refining vessels are examples of process stages in which temperature control is essential to achieve the best results in terms of product quality.

In view of the great difficulty to measure the temperature during these processes, since it involves handling molten steel in the converters, ladles and continuous casting tundish, the temperature monitoring is made through the utilization of special platinum or noble metal alloy thermocouples. Such thermocouples are attached to disposable heads for eventual measurements or properly protected for long measurements, as it is the case in the continuous casting solidification process. This process requires continuous temperature measurement in order to obtain optimum continuous casting machine operating control and proper slab quality.

Nowadays, the adopted method is the optical infra-red pyrometer, whose operating principle is based on the light emitted by a certain material. The light is captured by a sensor and transmitted by optical fiber up to a signal converter (from optical to electric signal). The readings are processed by the electronic signal converter by means of a mathematical equation that calculates and displays the temperature. This system is basically made up of a measuring device, articulated manipulator, signal conversion device and a control system.

The measuring device is mechanically linked to the articulated manipulator and electrically connected to the signal conversion device.

The optical unit, which is the very measuring unit, comprises one optical sensor, fastening tube, steel hose and optical fiber. The optical fiber carries the signal from the optical sensor up to the signal conversion device, which for its turn transmits it, as an electric signal, to the control system.

The measuring tube is a ceramic tube that is dipped into the molten metal and works as a field of view for the optical sensor.

In order to take a measurement, the articulated manipulator handles the measuring system so as to position it above the tundish and moves it until the ceramic measuring tube plunges into the metal bath down to a pre-established depth. The adjustment of the distance between the optical sensor and the measuring tube end dipped into the metal bath, along with the characteristic inside profile of the measuring tube and the sensor alignment, cause the sensor to focus on the desired field of view.

From the economic point of view, this method has proved to be more advantageous than the use of type B platinum sensor (thermocouple). However, it faced certain technical and operating problems, such as: high temperature in the infra-red sensor body (>200° C.); need for monitoring the temperature to protect the sensor; type of sensor protection and installation box; stainless steel tube length and inside diameter required to fasten the sensor; to make the application suitable and the ceramic device exchange easier; ideal sensor and optical fiber cooling without affecting the measurement; accurate determination of the distance between the sensor and the bottom of the ceramic tube; definition of the ceramic tube inside diameter in order to carry out an exact measurement; suitable ceramic tube length; occurrence and elimination of silica inside the ceramic tube; gas pressure variation in the sensor and optical fiber cooling system; measurement interference when the steel bath level changes; fastening and alignment of the sensor in the stainless steel tube; adjustment of measurement response time; correction factor adjustment; measuring ratio of the two sensors (slope).

SUMMARY OF THE INVENTION

This invention's aim is to solve these problems and enable the use of optical instruments for the continuous temperature measurement in processes involving high temperatures, like the continuous casting. A device was designed to allow the adaptation of and protection to both the measuring tube and the optical instrument.

BRIEF DESCRIPTION OF THE DRAWINGS

The present invention will be better understood and appreciated by reading the following detailed description in conjunction with the accompanying drawings, in which.

LIST OF REFERENCE CHARACTERS

Figure 1:
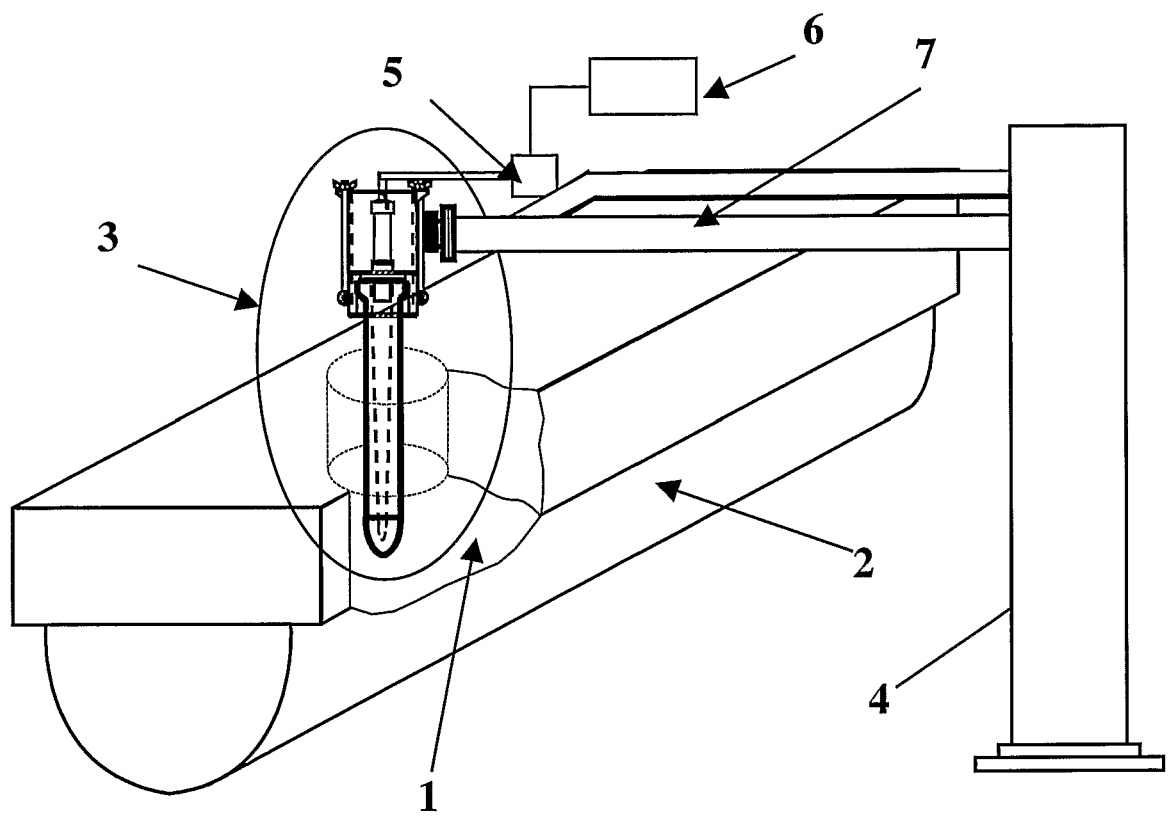
FIG. 1 is a perspective view of the Device for Continuous Temperature Measurement of Molten Steel in the Tundish using Optical Fiber and Infra-red Pyrometer with a cutout in the area of the molten dish.
Figure 2:
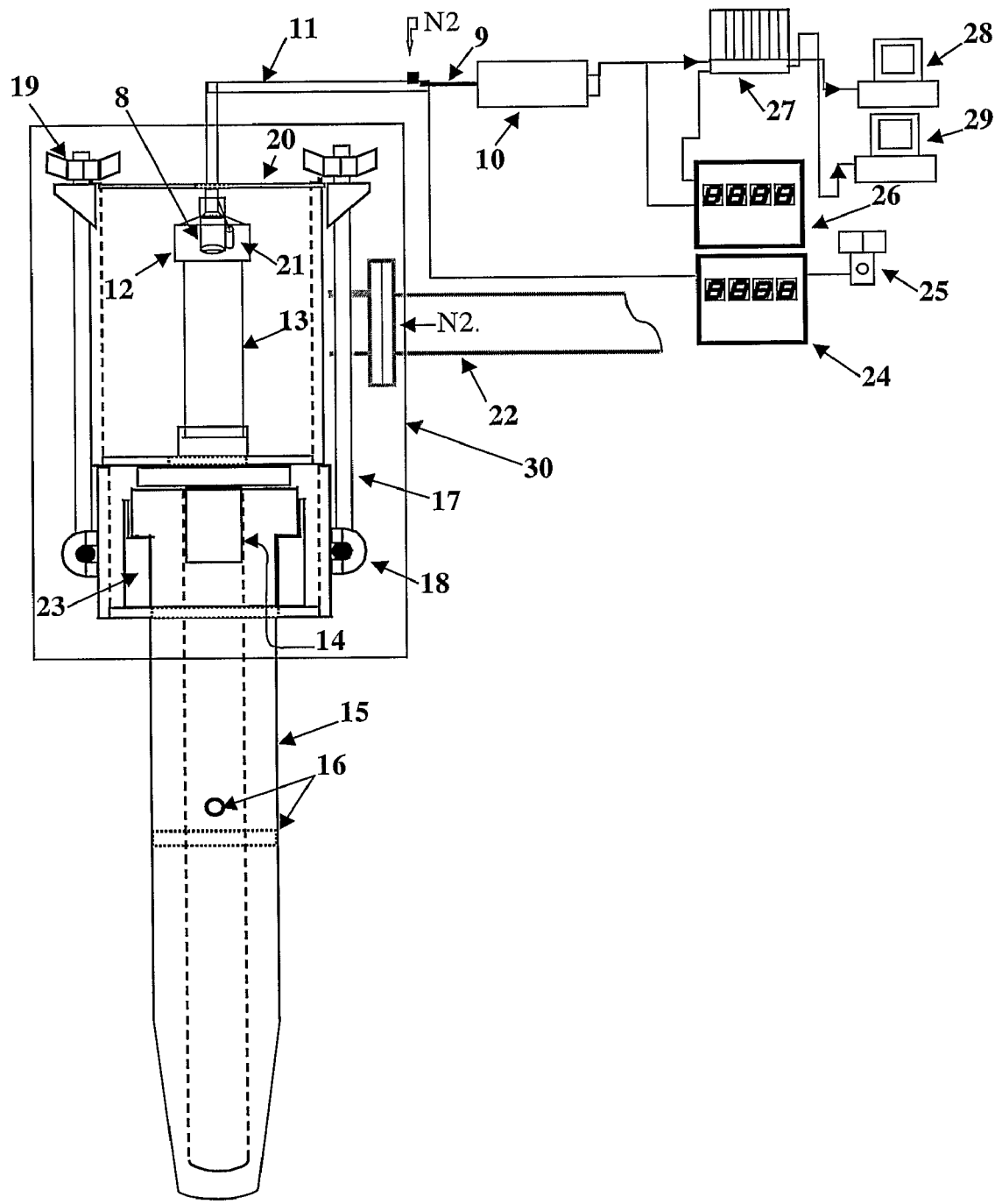
FIG. 2 is a side view and a schematic of the electrical system thereof.

This device is shown in FIGS. 1 and 2, where:
1. molten steel
2. tundish
3. measuring device
4. articulated manipulator
5. signal conversion device
6. control system
7. manipulator arm and inert gar inlet
8. optical infra-red sensor
9. optical fiber
10. optical signal converter
11. steel hose
12. optical sensor fastening nipple
13. optical sensor fastening and cooling tube
14. guiding tube for the ceramic measuring device
15. ceramic tube
16. inert gas outlet holes
17. locking rod
18. locking rod hinges
19. thumb nut for fastening the locking rod
20. maintenance access cover
21. optical sensor temperature monitoring thermocouple
22. manipulator arm
23. ceramic tube seat
24. internal sensor temperature control
25. audio-visual display
26. local continuous temperature display 27. programmable logic controller of the continuous casting machine
28. supervisory station
29. process computer
30. cooled jacket

DETAILED DESCRIPTION OF THE INVENTION

The developed measuring device features a cooled jacket (30) to protect the optical infra-red sensor (8). This is a two-color sensor (8) and it is provided with optical fiber (9) and an optical signal converter (10) (from optical to electric signal). The optical infra-red sensor (8) is focused inside a ceramic tube (15) made of pressed graphited alumina, which is capable of providing fast light and thermal conductivity, thus enabling the molten steel (1) temperature to be accurately measured while the steel is in the tundish (2). This ceramic tube (15) life depends on the steel grade being produced. It lasts 24 hours on average, eventually more. The ceramic tube (15) base was changed to ensure precise manufacturing and ease of replacement during operation. Improvements were introduced in the optical sensor (13) cooling and fastening tube with an aim to make the ceramic tube (15) exchange easier. The optical sensor temperature monitoring thermocouple (21) is fitted with a temperature controller (24) to generate an audio-visual display (25) if the temperature is higher than the established value.

The optical infra-red sensor (8) basic operating principle is based on the reading of light radiation emitted by a certain material. The irradiated light is read by an optical infra-red sensor (8) and transmitted by optical fiber (9) up to a signal converter (10), which converts the signal from optical to electric (4 to 20 mA output). The two-color optical infra-red sensor (8) is provided with two sensors for simultaneous reading. The readings are processed by the electronic signal converter (10) by means of a mathematical equation that calculates and delivers as an output the process temperature, which is proportional to the ceramic tube (15) temperature. The equation result does not depend on the ceramic tube (15) emissivity; rather, it depends only on the wave length generated inside the hot ceramic tube (15), which is proportional to the temperature to which it is subjected.

In this system, the ceramic tube (15) needs to be replaced every 15 hours of operation, i.e. when the tundish (2) is changed; it is not necessary to exchange the optical infra-red sensor (8). This replacement is a fast, easy task.

The advantages of using this measuring device are: the operator is exposed to high temperatures for less time, enhanced operating safety, lower operating cost, reduced maintenance cost, higher measurement reliability, and possibility of controlling the casting speed through a process computer.

The device is free from operator interference during the measurement and handling for replacing the ceramic tube (15), since the optical infra-red sensor (8) was assembled in such a way that external impacts do not cause any damage during the ceramic tube (15) exchange.

The invention claimed is:

1. A device for continuous temperature measurement of molten steel in a tundish using optical fiber and infra-red pyrometer, comprising:
   a ceramic tube positioned above the tundish and moved until being plunged into a metal bath down to a pre-established depth;
   a plurality of gas outlet holes located on the ceramic tube to allow removal of silica particles formed inside the ceramic tube during a measurement process;
   a gas pressure control to maintain stability of the temperature measurement;
   a seat for supporting the ceramic tube;
   a plurality of articulated locking rods for securing the seat; and
   a plurality of thumb nuts for retaining the locking rods.

2. The device for continuous temperature measurement of molten steel in a tundish using optical fiber and infra-red pyrometer of claim 1, wherein the gas for purging the interior of the ceramic tube and for maintaining the stability of the temperature measurement is dry atmospheric compressed air.

3. The device for continuous temperature measurement of molten steel in a tundish using optical fiber and infra-red pyrometer of claim 1, wherein the gas for purging the interior of the ceramic tube and for maintaining the stability of the temperature measurement is a non-combustible gas.

4. The device for continuous temperature measurement of molten steel in a tundish using optical fiber and infra-red pyrometer of claim 1, wherein the gas outlet holes are equal in diameter and equidistant on a circumferential part of the ceramic tube, extending from the interior of the ceramic tube to the exterior of the ceramic tube and vertically positioned above the surface of the molten steel.

5. The device for continuous temperature measurement of molten steel in a tundish using optical fiber and infra-red pyrometer of claim 1, wherein the silica particles formed inside of the ceramic tube are dragged through the gas outlet holes by injecting a gas in a superior part of the ceramic tube with a pressure higher than atmosphere pressure.

6. The device for continuous temperature measurement of molten steel in a tundish using optical fiber and infra-red pyrometer of claim 1, wherein the gas for purging the interior of the ceramic tube and for maintaining the stability of the temperature measurement is an inert gas.

7. The device for continuous temperature measurement of molten steel in a tundish using optical fiber and infra-red pyrometer of claim 6, wherein the gas for purging the interior of the ceramic tube and for maintaining the stability of the temperature measurement is nitrogen.

* * * * *